United States Patent
Krishnan et al.

(10) Patent No.: US 7,869,551 B2
(45) Date of Patent: Jan. 11, 2011

(54) SYMBOL SYNCHRONIZATION USING PHASE DISCONTINUITY FOR DVB-T SYSTEMS IN AWGN CHANNELS

(75) Inventors: S Harish Krishnan, Bangalore (IN); Parag Naik, Bangalore (IN)

(73) Assignee: Tamiras Per Pte. Ltd., LLC, Dover, DE (US)

( * ) Notice: Subject to any disclaimer, the term of this patent is extended or adjusted under 35 U.S.C. 154(b) by 618 days.

(21) Appl. No.: 11/874,337

(22) Filed: Oct. 18, 2007

(65) Prior Publication Data

US 2008/0118006 A1  May 22, 2008

Related U.S. Application Data

(60) Provisional application No. 60/829,992, filed on Oct. 18, 2006.

(51) Int. Cl.
H04L 7/00    (2006.01)
(52) U.S. Cl. ................................ 375/354; 375/260
(58) Field of Classification Search ............... 375/354, 375/363, 368
See application file for complete search history.

(56) References Cited

U.S. PATENT DOCUMENTS

| | | | |
|---|---|---|---|
| 5,471,464 A | | 11/1995 | Ikeda |
| 6,058,121 A | * | 5/2000 | Kim et al. .................. 370/480 |
| 6,487,252 B1 | | 11/2002 | Kleider et al. |
| 6,853,616 B1 | * | 2/2005 | Kim et al. ................... 370/210 |
| 7,076,002 B1 | | 7/2006 | Ramirez-Mireles et al. |
| 7,710,858 B1 | * | 5/2010 | Cohen ....................... 370/210 |
| 2004/0246889 A1 | * | 12/2004 | Ogawa et al. .............. 370/210 |

FOREIGN PATENT DOCUMENTS

EP    1 178 642    2/2006

OTHER PUBLICATIONS

International Search Report dated Apr. 25, 2008 in PCT Application No. PCT/US2007/081833.
Examination Report dated Apr. 25, 2008 in PCT Application No. PCT/US2007/081833.

* cited by examiner

*Primary Examiner*—Kevin Y Kim
(74) *Attorney, Agent, or Firm*—Christensen O'Connor Johnson Kindness PLLC

(57) ABSTRACT

At a receiver incoming coded OFDM Symbol Data are passed through a Coarse Symbol Timing Synchronization module to determine the approximate start of the symbol. In one embodiment this is accomplished through correlation. The symbol is then passed through an FFT (2K or 8K, depending on the mode desired by the receiver). Since the Coarse Symbol Timing Synchronization module only determines an approximate start point of the symbol, a process of fine synchronization is used to adjust this approximate start point and determine a more accurate start point of the symbol. In this manner, the receiver is enabled to process COFDM symbols in DVB-T transmissions (where the symbols include a cyclic prefix to overcome echoes). One output of an FFT operation is magnitude. Magnitude is used for Channel Estimation (or Channel Correction). Another output of an FFT operation is phase discontinuity or rotations. Phase discontinuities are used in a fine synchronization process to determine the number of phase discontinuities. Phase discontinuity data of the symbol is passed through an N-Point FFT.

19 Claims, 5 Drawing Sheets

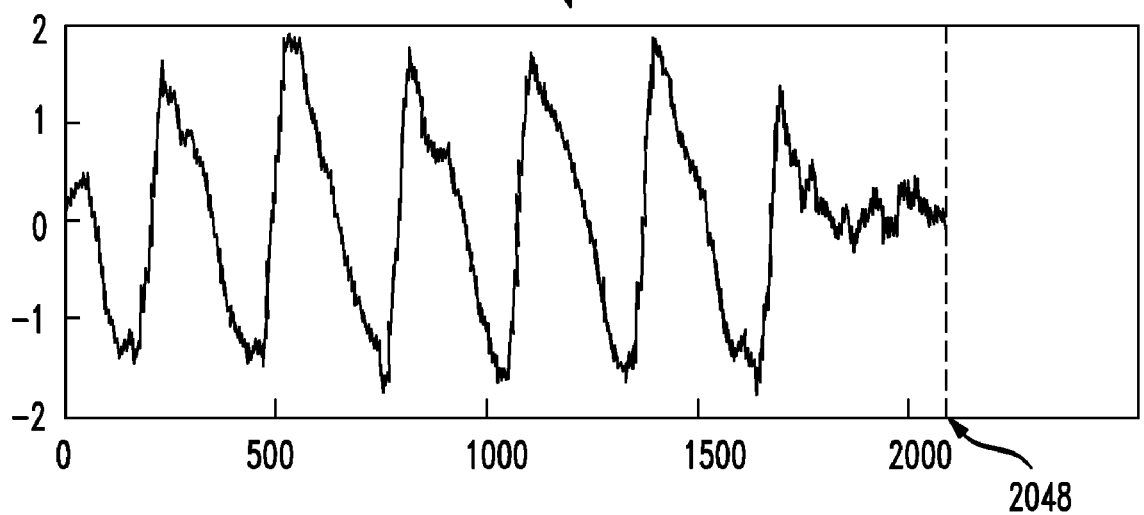
FIG. 6B
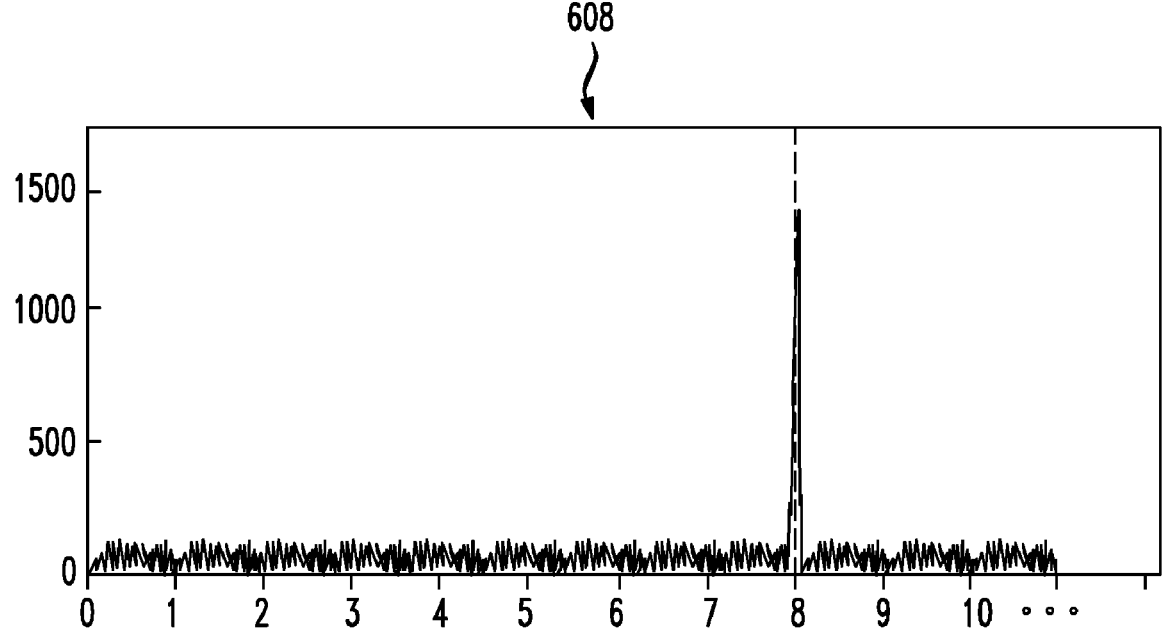

SYMBOL SYNCHRONIZATION USING PHASE DISCONTINUITY FOR DVB-T SYSTEMS IN AWGN CHANNELS

CROSS-REFERENCE TO RELATED APPLICATIONS

This application claims the benefit under 35 U.S.C. §119 of Provisional Patent Application No. 60/829,992, entitled "SYMBOL SYNCHRONIZSATION FOR DVB-T SYSTEMS USING DISCONTINUITY FOR AWGN CHANNELS", filed Oct. 18, 2006, incorporated by reference herein in it entirety.

BACKGROUND

In Europe the digital TV standard for terrestrial broadcast is known as Digital Video Broadcast-Terrestrial (DVB-T). This standard adopts Coded OFDM (or COFDM) symbols and techniques to circumvent typical problems of terrestrial broadcast transmission. These problems include echoes, which result in Inter-Symbol Interference or ISI (with the previous symbol) and multi-path distortion, in addition to the distortion from frequency-independent AWGN.

Typically, the DVB-T standard contains COFDM symbols (i.e., data packets) which include a "cyclic prefix," also referred to as a guard interval, to overcome echoes and ISI. There are generally no issues or problems on the transmission end with transmitting a symbol having a cyclic prefix. However, receiving a COFDM symbol having a guard interval and adhering to the DVB-T standard at a receiver has drawbacks that affect the quality of the signal. Removing the guard interval is not a viable option when using COFDM techniques because of echoes and ISI. The advantages of using COFDM for broadcasting digital media and the techniques themselves are explained in "The how and why of COFDM" by J. H. Stott (of BBC Research and Development), EBU Technical Review—Winter 1998, incorporated by reference herein for all purposes. Thus, it would be desirable for broadcasters to have receivers that are able to receive and process COFDM symbols while maintaining the high quality digital broadcasting capability of the DVB-T standard.

SUMMARY OF THE DESCRIBED EMBODIMENTS

At a receiver incoming coded OFDM Symbol Data are passed through a Coarse Symbol Timing Synchronization module to determine the approximate start of the symbol. In one embodiment this is accomplished through correlation. The symbol is then passed through an FFT (2K or 8K, depending on the mode desired by the receiver). Since the Coarse Symbol Timing Synchronization module only determines an approximate start point of the symbol, a process of fine synchronization is used to adjust this approximate start point and determine a more accurate start point of the symbol. In this manner, the receiver is enabled to process COFDM symbols in DVB-T transmissions (where the symbols include a cyclic prefix to overcome echoes). One output of an FFT operation is magnitude. Magnitude is used for Channel Estimation (or Channel Correction). Another output of an FFT operation is phase discontinuity or rotations. Phase discontinuities are used in a fine synchronization process to determine the number of phase discontinuities. Phase discontinuity data of the symbol is passed through an N-Point FFT.

In one embodiment, a method is described in which an OFDM symbol is received, the symbol having a useful data portion starting at an actual useful data start point and a cyclic prefix and where a receiver begins processing the symbol at a random sample in the symbol. A time synchronization function is performed on the symbol, thereby obtaining an initial estimated start point of the useful data in the symbol. A first FFT is executed on the symbol using the initial estimated approximate start point to derive a first FFT window, the first FFT producing a phase response and a magnitude response. A second FFT is executed on the phase response from the first FFT, thereby producing an output which is analyzed to determine a sample offset value. The initial estimated start point is adjusted using the sample offset value, thereby obtaining a final estimated start point of the useful data in the symbol. A second FFT window is derived for use by the first FFT, wherein the final estimated start point is closer to the actual useful data start point than is the initial estimated start point.

In another embodiment, a receiver for receiving coded OFDM symbols is described. The receiver includes a time synchronization module for determining an approximate useful data start sample in a symbol having a useful data portion and a cyclic prefix. Also included is a first FFT module that accepts as an input an OFDM symbol and outputs a phase response, an associated FFT window control module that accepts as input the approximate useful data start sample, and a second FFT module. In another embodiment, the receiver includes a peak detector for measuring a peak value of an output of the second FFT module and a gradient detector for determining the direction of a sample offset.

BRIEF DESCRIPTION OF THE DRAWINGS

References are made to the accompanying drawings, which form a part of the description and in which are shown, by way of illustration, specific embodiments of the present invention.

DESCRIPTION OF EMBODIMENTS

Methods and systems for enabling efficient reception, processing, and integration of COFDM signals sent by a broadcaster to multiple receivers, such as TV set-top boxes at consumers' homes, using the Digital Video Broadcasting-Terrestrial (DVB-T) are described in the various figures. Sound and television terrestrial broadcasting is now at the stage in which the main audio and video signals will themselves be broadcast in digital form. Systems such as DVB-T have been standardized by ETSI for use in Europe and elsewhere in the world. A new form of modulation known as COFDM is used for this system (as well as in others, such as DAB). COFDM involves modulating broadcast data onto a large number of carriers using an FDM technique. The key features that make COFDM work in a manner well suited for terrestrial channels include: orthogonality, the addition of a guard interval or cyclic prefix, and the use of error coding, interleaving and channel-state information.

Figure 1:
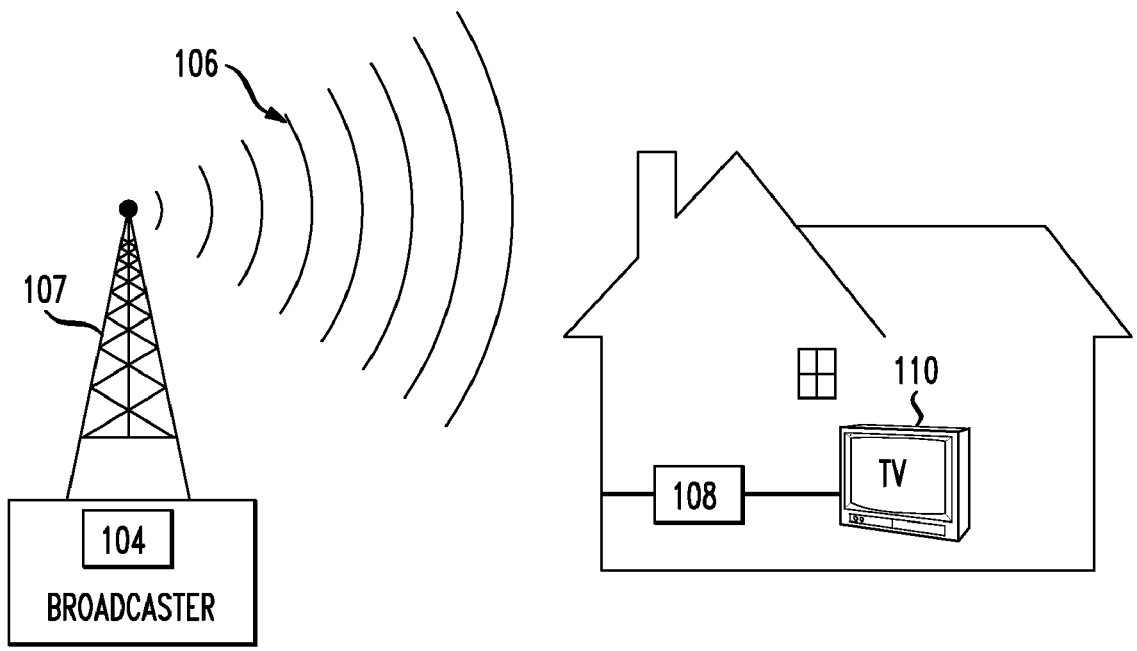
FIG. 1 is a network diagram showing the general context in which particular embodiments of the present invention are implemented.

Particular embodiments of the present invention address issues that arise from the use of a cyclic prefix in the COFDM modulation form. FIG. 1 introduces the general context in which particular embodiments of the present invention are implemented. A broadcaster 102 or other entity wanting to transmit broadcast signals using a digital broadcast standard, such as DVB-T, does so using a transmitter 104. Analog signals 106 are transmitted from transmitter 104 via, for example, a transmission tower 107 or via cable (not shown) to multiple receivers, an example of which is shown as receiver 108 at a consumer home 110 which allows the consumer to watch in digital form the audio and visual media (e.g., TV shows, movies, music, etc.) being transmitted. Receiver 108 may be connected to or be part of a cable box or set-top box which, in turn, may be connected to a TV 110, entertainment system, or personal computing device, such as a PC.

The DVB-T standard for broadcasting digital media is highly flexible and widely used in Europe, is able to broadcast over wide geographic terrain, and has other known advantages. It is important that receiver 108 integrate COFDM symbols efficiently to avoid distortion and distraction in the signal which, in turn, has a direct impact on the quality of the picture seen on a TV screen, the quality of the audio heard by consumers in their homes, and the like. As such, this is of primary importance to digital broadcasters, content producers, and suppliers of TVs monitors and other display equipment.

In one embodiment, an OFDM symbol can be represented mathematically by s(t) in formula [1] below:

$$s(t) = \sum_{k=k_{min}}^{k_{max}} c_k \times \Psi_k(t) \quad [1]$$

where, $\Psi_k(t) = e^{j2\pi kt/T_u}$, for time t within a time of the Symbol period or 0 otherwise.

$$\Psi_k(t) = e^{j2\pi kt/T_u},$$

As can be seen from equation [1], a COFDM symbol can be represented as an FFT at the receiver, with a frequency resolution equal to $1/T_u$. The size or mode of the FFT may be decided by the transmitter or broadcaster, which may be 2048 (2 k mode) or 8192 (8 k mode). A COFDM symbol may have 2048 frequencies or 8192 frequencies, thus 2 k or 8 k samples of the symbol, respectively, are needed for a complete cycle and for the FFT to generate correct data symbols.

Figure 2:
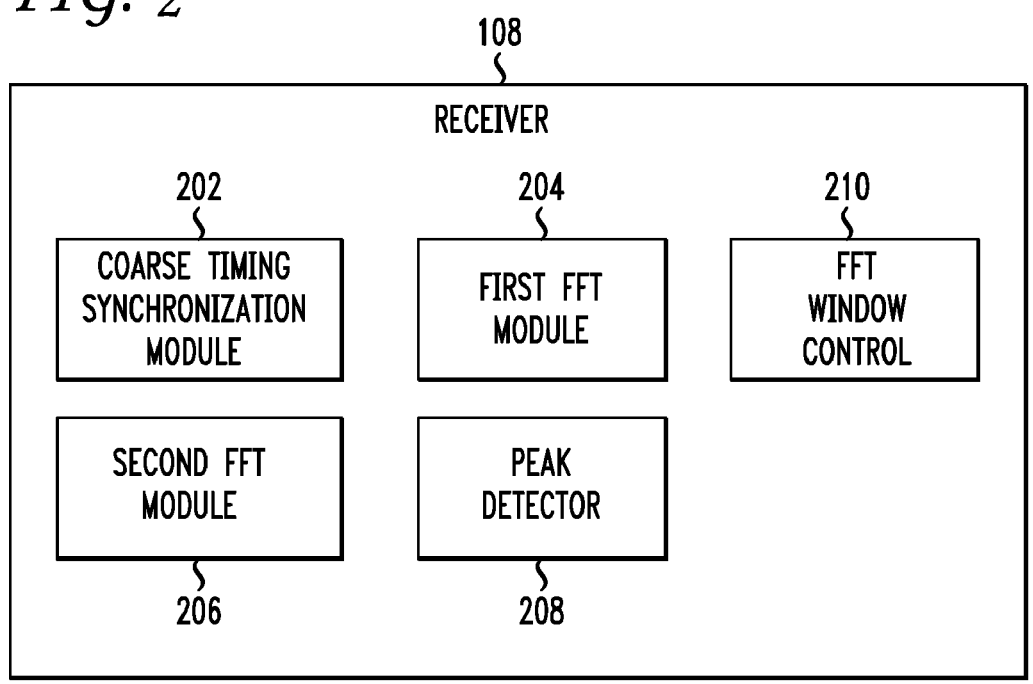
FIG. 2 is an overview block diagram of a receiver that receives COFDM symbols in accordance with particular embodiments of the present invention.

FIG. 2 is an overview block diagram of receiver 108 that receives COFDM symbols in accordance with particular embodiments of the present invention. In one embodiment, receiver 108 has a coarse timing synchronization module 202, a first FFT module 204, a second or N-Point FFT module 206, a peak detector 208, and a first FFT window control module 210. The utility of these modules is described in the flow diagrams, equations, and plots provided below. In other embodiments, other components may also be included in receiver 208 which are not shown in FIG. 2, such as a low pass filter, gradient detector, channel correction components, input/output ports and several others.

Figure 3:
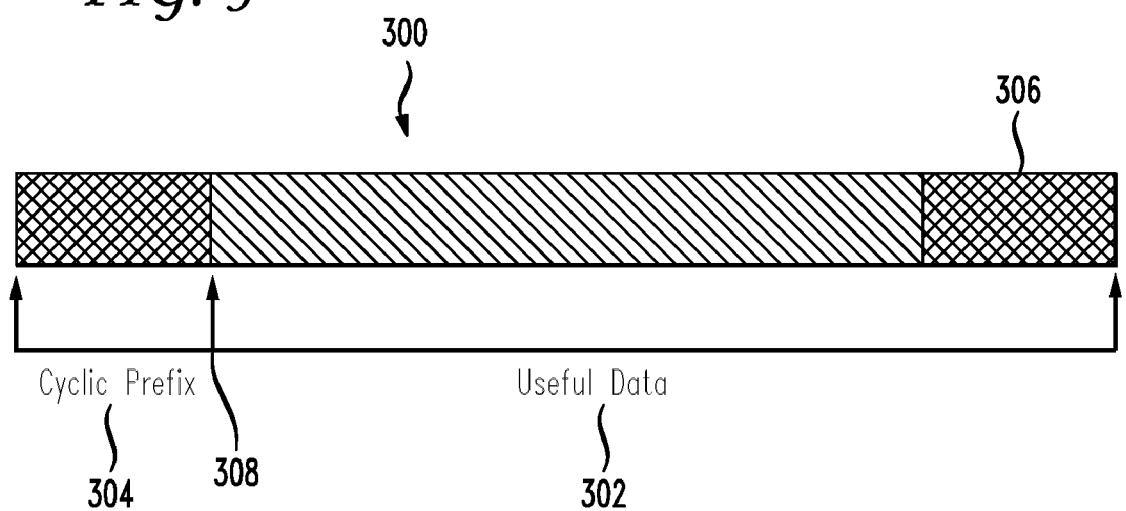
FIG. 3 is an example diagram of a COFDM symbol format showing specifically the useful data and cyclic prefix.

When receiver 108 is turned on, it begins receiving data samples at a random point in a COFDM symbol. FIG. 3 is an example diagram of a COFDM symbol format showing specifically the useful data and cyclic prefix. A data symbol 300 has two sections: useful data 302 and cyclic prefix 304. The length of the cyclic prefix could be ¼, ⅛, 1/16 or 1/32 of the useful data or symbol. This length may be decided by the entity operating the DVB-T transmitter or by the transmitter. A portion of useful data 302 shown as 306 is identical to cyclic prefix 304. It is preferable that the beginning of useful data of a COFCD symbol point 308 be determined as accurately as possible in order for an FFT to generate the correct data symbol, which directly results in improved DVB-T signal reception, as well as for other types of signals under other standards. Generally, timing cannot be synchronized because the transmitter has a sampling clock that is different from the clock in the receiver (and each receiver will have its own clock). This difference or shift in time domain typically leads to a shift in the frequency domain and results in distortion and disruption in processing COFDM symbols.

In one embodiment, coarse timing synchronization is performed on the incoming OFDM symbol 106 (i.e., block of data in the form of analog signals, such as RF signals). The goal of this synchronization is to determine an approximate start point 305 or beginning of the useful data in a symbol as shown in FIG. 3. As noted, the cyclic prefix is a fraction, of the useful data (i.e., symbol) that is prefixed to the beginning of the useful data. By adding prefix 304, a complete COFDM symbol 300 is formed, as shown in FIG. 3. As described above, motivation for having a cyclic prefix is that it may absorb any ISI caused due to echoes.

Figure 4:
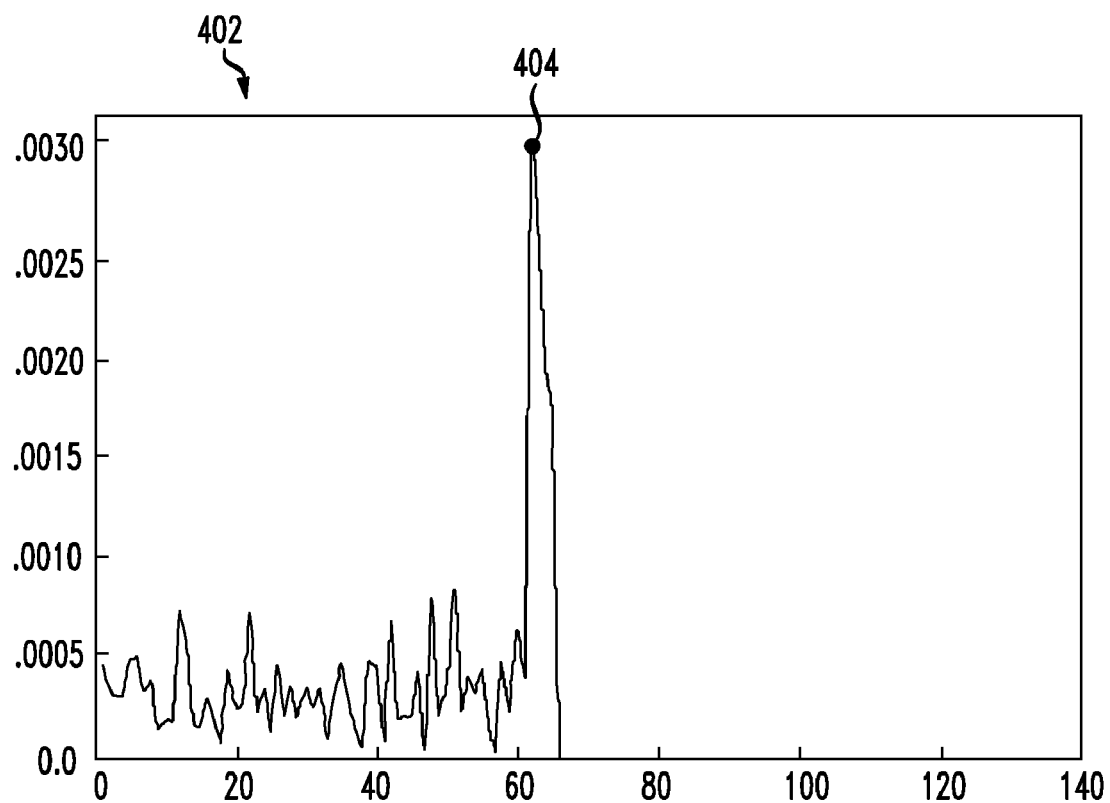
FIG. 4 is a graph showing a statistical correlation plot where the peak indicates a data samples match.

For purposes of illustration, assume the useful data section is 100 samples and the cyclic prefix is 20 samples, which are the same as samples 80 to 100 in the useful data section. In one embodiment 120 samples are randomly collected. The only thing that is known is that the first 20 samples are the same as the last 20. This information can be used in a statistical correlation function to determine an approximate symbol start of the 100 samples of useful data. In this function data samples are compared to previous data samples. When a high correlation or match is found, the receiver has an approximate begin point of the useful data because of the cyclic prefix. In one embodiment, when the correlation function compares the first twenty data samples with the last twenty, a high statistical correlation will result. For example, the first data sample (starting from a random point in the incoming data symbol) should be the same as the $81^{st}$ data sample, as should be the case for the next 19 data samples, after which the beginning of the useful data should begin. The graph shown in FIG. 4 shows a statistical correlation plot where the peak indicates a data samples match. When additive white Gaussian noise (AWGN) is added to the signal, the peak will typically shift to the left or right, thereby decreasing the accuracy of using the peak from the statistical correlation method as indicating an approximate or "coarse" starting point of the useful data.

Once a window of 100 samples of useful data have been approximately identified using the coarse timing synchronization, the data are passed to an FFT window control module which operates with or provides the data to a first FFT process as described below.

The COFDM symbols go through various stages of processing before they are demodulated by the receiver. One stage is performing coarse timing synchronization on the symbol. In one embodiment this may be done by using a statistical correlation property between the useful data and the cyclic prefix as described above. One example of implementing this function is shown in the following equation where r(n) is the "statistical correlation property":

$$\hat{r}(n) = \sum_{n=0}^{N_g} s(n)s^*(N_u + n) \quad (2)$$

Where:

s(n) denotes the useful data symbol $N_u$ denotes the number of samples in useful data time $N_g$ denotes the number of samples in cyclic prefix time The peak in the plot resulting from this function provides a coarse estimate of the start point of a new symbol or, in other words, the start of the "FFT window." A plot showing the statistical correlation property is shown in FIG. 4. Graph 402 has a peak 404 which is a coarse estimate of the beginning of useful data in a symbol. The x-axis is measured in number of samples and the y-axis measures magnitude or strength of the correlation. In this example peak 404 or highest correlation is approximately at 85 samples.

Shifting the time domain of the symbol by one or more samples causes a phase discontinuity in r, the frequency domain. This phase discontinuity may be shown mathematically in the formula below:

$$X_{shifted}(k) = e^{j2\Pi km/N} X(k)$$

where, $X_{shifted}(k)$: Fourier transform of shifted samples

X(k): Fourier transform of samples with correct FFT window position (or correct symbol start time)

K: Frequency Index

M: Number of samples shifted

N: FFT length (or mode, 2 k or 8 k)

As described above, a receiver may use FFT to receive and process a COFDM symbol. It is important to the FFT process that the FFT module know exactly (or have a very accurate estimation of) where the symbol starts. That is, it is important to have an accurate FFT window in order to obtain a correct data symbol for demodulation and channel correction. The symbol period is extended so it exceeds the receiver integration period. At the receiver the process of integration of the symbol becomes one of summation and the demodulation process takes on a form which is similar if not identical to a Discrete Fourier Transform. As is known, efficient Fast Fourier Transforms or FFT implementations of Discrete Fourier Transforms are available.

The COFDM symbol is inputted into FFT module 204. The start point of the symbol is approximately determined during the statistical correlation function described above. The number of samples inputted may depend on the number of frequencies in the symbol, such as 2 k or 8 k in the case of OFDM symbols, which in turn determines the mode of FFT module 204. The FFT produces a phase response output and a magnitude output, as described in greater detail below.

In particular embodiment, coarse synchronization and fine synchronization are used at the receiver to determine the start of a COFDM symbol. More specifically, the coarse synchronization produces "phase discontinuities" (or phase rotations) which are used in the fine synchronization process to obtain a very close estimate of where the symbol starts. This symbol start information is input to window control 210 and FFT module 204 at the receiver so that the receiver can receive and process the COFDM symbol without distortion or degradation under the DVB-T standard.

At receiver 108, in order for FFT 204 to generate the correct data symbol, $c_k$, it may be necessary that the input to the FFT module 204 begin at the start of the symbol and that it receive data only from that data symbol. That is, there should be no echoes or ISI in the symbols used as input to an FFT at the receiver. Although the cyclic prefix provides a cushion to absorb the echoes, the onus of identifying the data symbol boundary or symbol synchronization lies with the receiver. If the receiver uses an FFT for receiving and demodulating the COFDM symbol, it is the receiver's responsibility to ensure symbol timing synchronization, also referred to as identifying the "FFT window."

The following may be derived by examining the phase discontinuity in equation [3]. The phase discontinuity of pilot samples (representative samples that server as reference signals for which qualities such as amplitude, phase, etc. are known; pilots can be used to see what a channel has done to a signal) for the shifted spectrum given below in equation [4]:

$$\Phi_{shifted}(k) = 2\Pi km/N + \Phi_v(k) + \Phi_p(k)$$

where, $\Phi_{shifted}(k)$: Phase response of the pilots for the shifted spectrum $\Phi(k)$: Phase response for the samples with correct FFT window position or correct symbol start time $\Phi_v(k)$: Contribution to Phase response due to channel imperfections $\Phi_p(k)$: Transmitted pilot phase, takes a value of '0' or 'Π'

K: Frequency Index

M: Number of samples shifted

N: FFT length or mode

The transmitted pilots (which are part of the COFDM DVB-T signals) carry a phase of either 0 or Π, and may be treated as constant. As can be observed from the above equation (2), a discontinuity in the phase is introduced by the first term (2 ΠkmlN). This phase discontinuity is directly proportional to the number of samples shifted in the time domain In particular embodiment, as shown in the block diagram of FIG. 2, a system involves counting the number of phase discontinuities using an FFT. As described below, the frequency index, K, of the peak value of an N-point FFT of the phase response may yield a close estimate of the number of samples shifted. This scheme (that is, using the frequency index K of the peak value of the second FFT to get a close estimate of the number of samples shifted) works well for low signal to noise ratios (SNRs). In one embodiment, an efficient gradient detector may be used to determine the direction of the sample shift.

Figure 5:
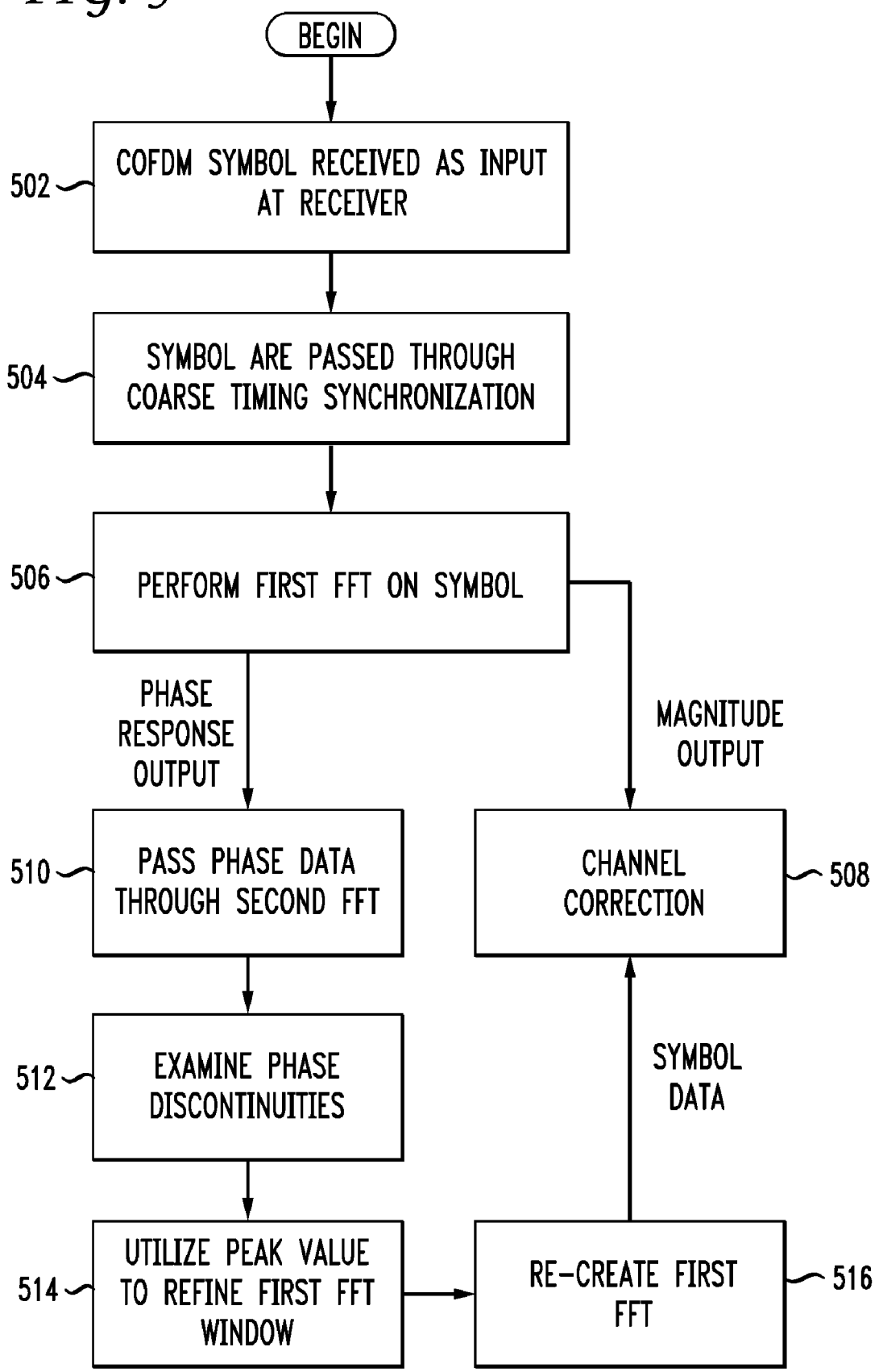
FIG. 5 is a flow diagram of a process of identifying an accurate FFT window in accordance with particular embodiments.

FIG. 5 is a flow diagram of a process of identifying an accurate FFT window or, in other words, locating an accurate boundary of a COFDM symbol to enable an FFT to generate a correct data symbol in accordance with particular embodiments. At step 502 a receiver or other component capable of receiving a COFDM signal, for example, under the DVB-T broadcasting standard, receives a signal. The signal may be received at any random point in a symbol given that the transmitter and receiving component operate by using different (or unsynchronized) clocks. To repeat briefly from the description above, a symbol may have, for example, 2 k number of samples or 8 k samples of data. The cyclic prefix may be a certain fraction of this length and is added to the beginning of a data symbol as described above in FIG. 3.

At step 504 the symbols (or blocks of data comprising the analog COFDM signal) are passed through a coarse symbol timing synchronization module. In one embodiment, this module uses statistical correlation to estimate the beginning of useful data in a symbol. For a symbol having 2 k number of samples and a cyclic prefix of ⅓ of the useful data or 676 samples, 2723 samples (2048 plus 676) are collected and processed for statistical correlation. In the embodiment involving a symbol having 2 k samples, this is the minimum number of random samples needed for estimating the beginning of useful data of a symbol. However, as described above, there will likely be a certain number of sample offsets (or a margin of error) in the estimate, as a result of various factors including the accuracy of the statistical function itself, AWGN, and other sources of distortion known in the field. The estimated beginning may be x number of samples fewer or more than the estimate. Although the number of sample offsets may vary, numbers can range from 2 to 8 or more. As explained below, in particular embodiments, the coarse estimate of the beginning of a symbol need not be very accurate and may indeed be quite rough in its estimate without diminishing the effectiveness of the steps described below for fine synchronization.

At step 506 an FFT is performed on a symbol at the estimated starting point of useful data in the symbol. In order for the correct data to be extracted from the symbol for demodulation, a complete symbol is processed by the FFT. The mode of the FFT may be determined by the number of samples comprising a symbol, which in turn is dependent on the number of frequency comprising the symbol.

There are at least two outputs from the first FFT: a phase response output and a magnitude output. In particular embodiments, the phase response output is further utilized in the described methods. The magnitude output, while used by the receiver, is not, in the particular embodiments, utilized in the methods described below. In one embodiment, the receiver may perform channel correction (or estimation) using the magnitude output at step 508.

Figure 6A:
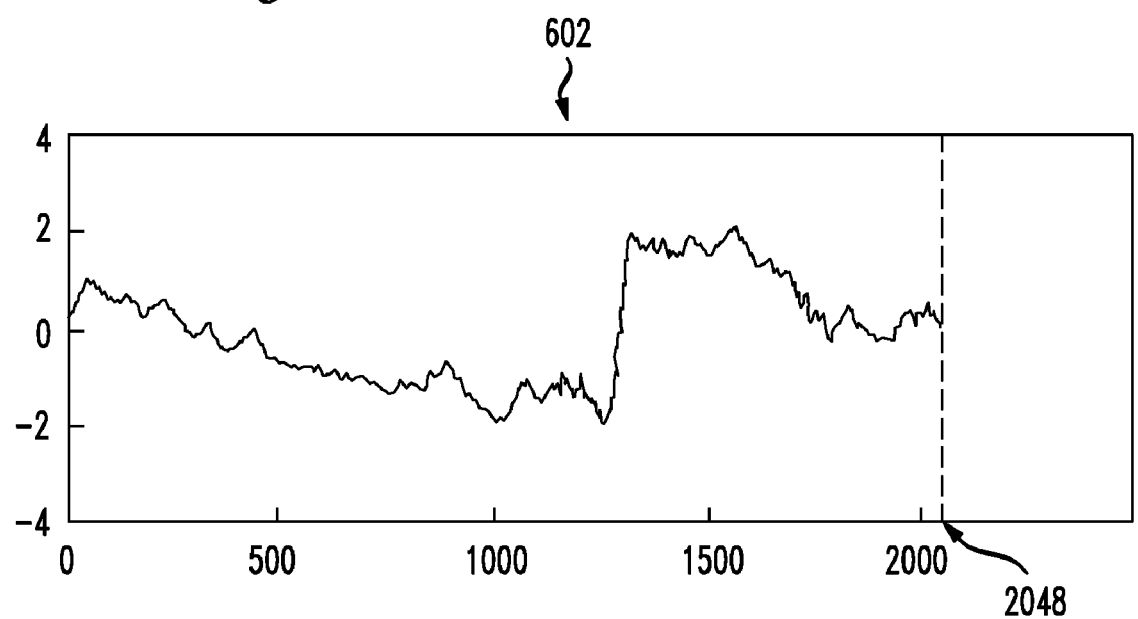
FIG. 6 shows two sets of graphs representing outputs from a first FFT module and a second FFT module in accordance with particular embodiments.
Figure 6A:
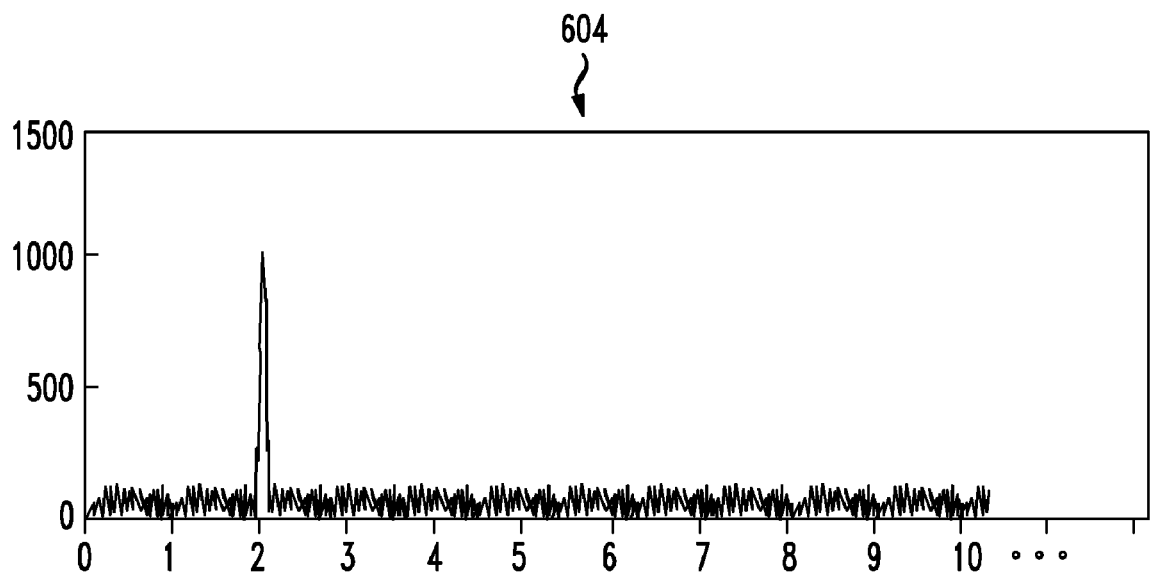

Graphical representations of examples of phase response output resulting from the first FFT inputted with symbols having different sample offsets are shown in FIG. 6. At step 510 the phase response output is used as input to a second FFT module. In one embodiment, the second FFT module is an N-point FFT. One characteristic of the particular embodiment is that the phase response output is examined in the second FFT, rather than the frequency response, thus, the discontinuities in the phase response (in a frequency domain) are used as described below. At step 512 the phase discontinuities (or phase rotations) that are outputted from the N-point FFT at step 510 are examined. In one embodiment, the examination involves determining the peak of the FFT output which reflects the number of phase discontinuities in the phase response output of the first FFT. This may be done by utilizing a peak detector on the N-point FFT output graph.

In particular embodiments, the peak value of the graph is used as an estimate of the number of sample offsets in the FFT window used as input to the first FFT. In this manner the number of phase discontinuities in the phase response from the first FFT is used to refine the estimate of the symbol starting point. At step 514 the peak value is used as input to FFT window control module 210 for adjusting the window or start point of a symbol to the first FFT. At this stage first FFT module 204 executes again at step 516 and creates a more accurate data symbol for channel estimation and correction and further demodulation. As shown in FIG. 6 below, the peak value of the second FFT provides a close estimate of the actual number of samples that were offset when the symbol was used as input to the first FFT. The FFT window control module takes the peak value and adjusts the symbol start point (which it stored during the first FFT) according to the value. For example, if the peak value is 3, the FFT window control moves the symbol start 3 samples ahead or back. A gradient detector may be used to determine the direction of the offset correction needed. With this correction to the sample offset, timing synchronization is fine tuned, a complete OFDM symbol has been identified, and correct symbol data may be retrieved from the FFT.

FIG. 6 shows two sets of graphs representing outputs from first FFT modulation 204 and second FFT module 206. Graphs 602 and 606 show sample results of the first FFT. The y-axis measures the phase of the input symbol in gradients ranging from −4 to 4. The x-axis represents FFT frequency "bins" and measures the number of samples having a particular frequency. In the examples shown, the OFDM symbol has 2048 frequencies. The plot or line in each of the graphs extends only to 2048 as shown by the dotted line. If the symbol had 8 k frequencies, the plot would extend only as far as 8192.

To illustrate the methods described above, assume that in graph 602, the sample offset from the coarse estimate is three samples, and in graph 604, the sample offset is 9 samples. That it, the start points of symbols input to the first FFT were off by 3 samples and 9 samples, respectively. Graphs 606 and 608 show portions of the outputs of the N-point FFTs or the second FFTs. The y-axis shows the magnitude of the signal and is measured in linear scale. The x-axis represents FFT bins. As can be seen visually from graph 604, the peak is at 2 (a peak detector may be used to determine the value) which is very close to the actual number of sample offsets of 3. Graph 608 shows a peak at 8 which is also very close to the actual sample offset of 9. These values, 2 and 8, are inputted to FFT window control module 210 and used to correct the margin of error of the symbol start points by 66% and 88%, respectively.

Although illustrative embodiments and applications of this invention are shown and described herein, many variations and modifications are possible which remain within the concept, scope, and spirit of the invention, and these variations would become clear to those of ordinary skill in the art after perusal of this application. For example, although the system has been described in the context of DVB-T broadcasting standard, the present invention may be utilized in other standards using coded OFDM symbols. Accordingly, the embodiments described are to be considered as illustrative and not restrictive, and the invention is not to be limited to the details given herein, but may be modified within the scope and equivalents of the appended claims.

The invention claimed is:

1. A method comprising:
receiving an OFDM symbol having a useful data portion and a cyclic prefix, wherein the useful data portion starts in the symbol at an actual useful data start point, and wherein processing of the symbol begins at a random sample in the symbol;
performing a time synchronization function on the symbol, thereby obtaining a first estimated start point of the useful data portion in the symbol;

executing a first FFT on the symbol using the first estimated start point to derive a first FFT window, wherein the first FFT produces a phase response and a magnitude response;

executing a second FFT on the phase response from the first FFT, thereby producing an output;

analyzing the output to determine a sample offset value;

adjusting the first estimated start point using the sample offset value, thereby obtaining a second estimated start point of the useful data portion in the symbol; and deriving a second FFT window for use by the first FFT, wherein the second estimated start point is closer to the actual useful data start point than is the first estimated start point.

2. The method of claim 1, wherein said performing a time synchronization function on the symbol further comprises performing a statistical correlation function.

3. The method of claim 2, wherein said performing a stastical correlation function comprises comparing samples in the symbol and finding a high correlation between samples in the cyclic prefix and in the useful data portion.

4. The method of claim 1, wherein the first FFT window is derived using an FFT window control.

5. The method of claim 1, further comprising inputting the phase response to the second FFT.

6. The method of claim 1, further comprising inputting the magnitude response to a channel correlation module.

7. The method of claim 1, wherein the second FFT is an N-point FFT.

8. The method of claim 1, wherein said analyzing the output further comprises determining a peak value of the output from the second FFT using a peak detector.

9. The method of claim 1, further comprising determining a direction of the sample offset value using a gradient detector.

10. A receiver comprising:
a time synchronization module configured to determine an approximate useful data start sample in a symbol having a useful data portion and a cyclic prefix;
a first FFT module configured to accept as input an OFDM symbol and to output a phase response;
an FFT window control module configured to accept as input the approximate useful data start sample; and
a second FFT module configured to accept as input the phase response that is output from the first FFT module.

11. The receiver of claim 10, further comprising a peak detector configured to measure a peak value of an output of the second FFT module.

12. The receiver of claim 10, further comprising a gradient detector configured to determine the direction of a sample offset.

13. The receiver of claim 10, wherein the time synchronization module comprises a statistical correlation function module.

14. An apparatus comprising:
means for receiving an OFDM symbol having a useful data portion and a cyclic prefix, wherein the useful data portion starts in the symbol at an actual useful data start point and wherein processing of the symbol begins at a random sample in the symbol;
means for performing a time synchronization function on the symbol, thereby obtaining a first estimated start point of the useful data portion in the symbol;
means for executing a first FFT on the symbol using the first estimated start point to derive a first FFT window, wherein the first FFT produces a phase response and a magnitude response;
means for executing a second FFT on the phase response from the first FFT, thereby producing an output;
means for analyzing the output to determine a sample offset value;
means for adjusting the first estimated start point using the sample offset value, thereby obtaining a second estimated start point of the useful data portion in the symbol; and
means for deriving a second FFT window for use by the first FFT, wherein the second estimated start point is closer to the actual useful data start point than is the first estimated start point.

15. The apparatus of claim 14, wherein the means for performing a time synchronization function on the symbol further comprises means for performing a statistical correlation function.

16. The apparatus of claim 14, further comprising means for inputting the phase response to the second FFT.

17. The apparatus of claim 14, further comprising means for determining a peak value of the output from the second FFT.

18. The apparatus of claim 14, further comprising means for determining a direction of the sample offset value.

19. A receiver comprising:
a time synchronization module configured to determine an approximate useful data start sample in a symbol having a useful data portion and a cyclic prefix, wherein the time synchronization module includes a statistical correlation function module;
a first FFT module configured to accept as input an OFDM symbol and to output a phase response;
an FFT window control module configured to accept as input the approximate useful data start sample; and
a second FFT module configured to accept as input the phase response that is output from the first FFT module.

* * * * *

UNITED STATES PATENT AND TRADEMARK OFFICE
CERTIFICATE OF CORRECTION

PATENT NO. : 7,869,551 B2
APPLICATION NO. : 11/874337
DATED : January 11, 2011
INVENTOR(S) : Krishnan et al.

It is certified that error appears in the above-identified patent and that said Letters Patent is hereby corrected as shown below:

Column 1, line 10, delete "SYNCHRONIZSATION" and insert -- SYNCHRONIZATION --.

Column 1, line 13, delete "it" and insert -- its --.

Column 9, lines 18-19, in Claim 3, delete "stastical" and insert -- statistical --.

Column 10, line 8, in Claim 14, delete "point" and insert -- point, --.

Signed and Sealed this
Twenty-fourth Day of May, 2011

David J. Kappos
*Director of the United States Patent and Trademark Office*